UNITED STATES PATENT OFFICE.

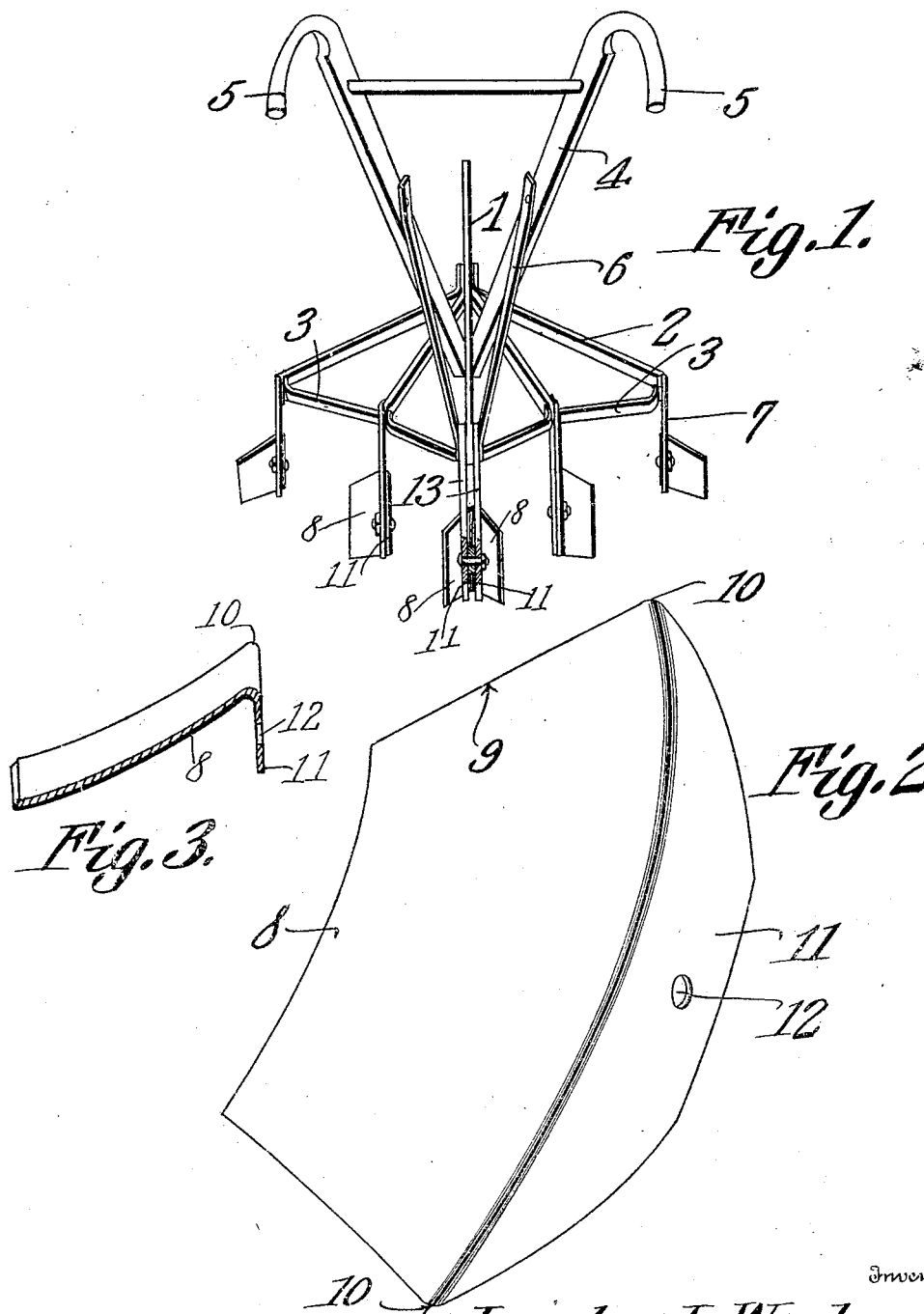

JOSEPHUS L. WOOLARD, OF WILLIAMSTON, NORTH CAROLINA.

CULTIVATOR.

962,806.

Specification of Letters Patent. Patented June 28, 1910.

Application filed August 12, 1909. Serial No. 512,572.

*To all whom it may concern:*

Be it known that I, JOSEPHUS L. WOOLARD, a citizen of the United States, residing at Williamston, in the county of Martin and State of North Carolina, have invented a new and useful Cultivator, of which the following is a specification.

This invention relates to cultivators, and its principal object is to provide a device of this character having a shovel reversibly mounted upon a stock so as to throw the loosened soil either to the right or to the left of the furrow.

Another object is to provide a shovel which can be reversed so as to prolong the life thereof.

A still further object is to provide devices of this character which can be assembled upon a single stock to form a furrow opener arranged to throw the loosened soil to both sides of the furrow.

A still further object is to provide a cultivator frame of novel form for use in connection with the shovel.

With these and other objects in view, the invention consists of certain novel details of construction and combinations of parts hereinafter more fully described and pointed out in the claims.

In the accompanying drawings, the preferred form of the invention has been shown.

In said drawings:—Figure 1 is a rear perspective view of a cultivator having the present improvements embodied therein. Fig. 2 is a perspective view of the shovel. Fig. 3 is a transverse section through said shovel.

Referring to the figures by characters of reference, 1 designates a central beam to opposite sides of which are fastened rearwardly diverging beams 2, all of said beams being held properly spaced apart at their rear ends by means of cross braces 3. Upwardly and rearwardly diverging bars 4 are fastened to the central beam 1 and terminate at their rear ends in handles 5, there being braces 6 connecting said bars 4 with the rear portion of the central beam 1. A stock 7 is bolted or otherwise secured to each of the beams 1 and 2 and secured to the lower portion of each stock is a shovel of novel form.

This shovel has been indicated in detail in Figs. 2 and 3 and, as shown in said figures, is made up of a curved plate 8 the ends of which are arranged along converging lines as indicated at 9, thus forming points 10 located at one side of the shovel. A flange 11 is formed along that edge of the shovel connecting the points 10 and this flange is provided at its center with an opening 12 designed to receive securing means. As shown particularly in Fig. 3 the flange 11 and the body portion of the shovel form an acute angle so that, when the flange 11 is fastened to one of the stocks 7, the soil loosened by the lower point 10 of the shovel will be deflected to one side by the blade 8.

It is to be understood of course that either edge 9 can be arranged lowermost, this being dependent upon the direction in which the soil is to be thrown. By placing one of the edges 9 at the bottom, the shovel will throw the soil to the right whereas by placing the other edge lowermost the soil will be thrown to the left. If preferred, and as shown at 13 in Fig. 1, two stocks may be connected to the central beam 1 and said stocks may be provided with separate shovels similar to the one shown in Fig. 4, said shovels however being oppositely disposed so as to form a plow designed to throw the soil both to the right and to the left. When the two shovels are thus assembled a single bolt can be extended through the openings within the flanges thereof and also through the standard, this bolt thus serving to hold both of the shovels in fixed relation to the standard. Moreover, as shown in said figure, those of the shovels located at the right of the central beam 1 can be arranged to throw the soil to the right while those located at the left of said beam can be arranged to throw the soil in the opposite direction. It is of course to be understood that the shovels can be placed in any desired relation to each other according to the work to be performed.

A device as herein described can be readily stamped from sheet metal, and constitutes an efficient cultivator shovel or plow which is particularly advantageous because it is capable of being reversed, the life of the said shovel being thus practically doubled.

Various changes can of course be made in the construction and arrangement of the parts without departing from the spirit or sacrificing the advantages of the invention.

What is claimed is:—

1. The combination with a stock, of oppositely disposed shovels each including a plate having a point at each end thereof, and a flange extending along one side of the plate and at an acute angle to said plate, said flanges and stock having registering fastener receiving openings, and a fastener arranged within said openings and constituting means for securing both of the shovels in fixed relation to each other and to the stock.

2. In a device of the class described, a shovel comprising a longitudinally bowed plate having its end edges converging to form points at one side of the shovel, and a flange extending from said side and disposed at an acute angle to the convex face of the plate, there being a fastener receiving opening within the flange.

3. The combination with a stock, of a shovel including a plate having its end edges converging toward one side, there being points formed by said edges and the other side, and a flange extending from said last mentioned side and disposed at an acute angle to the convex face of the plate, said plate being bowed from one end to the other, said stock being seated within the angle formed by the plate and the flange, there being registering fastener receiving openings within the flange and stock.

In testimony that I claim the foregoing as my own, I have hereto affixed my signature in the presence of two witnesses.

JOSEPHUS L. WOOLARD.

Witnesses:
  GEO. J. DOWELL,
  A. D. MIZELL.